United States Patent [19]

Roth et al.

[11] Patent Number: 5,418,764
[45] Date of Patent: May 23, 1995

[54] RECORDING DEVICE, A RECORD CARRIER HAVING PREFORMATTED ADDRESS CODES AND AUXILIARY CODES PROVIDING CONTROL DATA FOR USE BY THE RECORDING DEVICE, AND AN INFORMATION RECORDING SYSTEM INCLUDING BOTH THE RECORDING DEVICE AND THE RECORD CARRIER

[75] Inventors: Rudolf Roth; Paulus C. M. Van Der Zande, both of Eindhoven, Netherlands

[73] Assignee: U.S. Philips Corporation, New York, N.Y.

[21] Appl. No.: 41,141

[22] Filed: Mar. 31, 1993

Related U.S. Application Data

[63] Continuation of Ser. No. 518,883, May 4, 1990, abandoned, which is a continuation-in-part of Ser. No. 287,941, Dec. 19, 1988, Pat. No. 5,060,219, and a continuation-in-part of Ser. No. 453,545, Dec. 20, 1989, abandoned, which is a continuation-in-part of Ser. No. 265,638, Nov. 1, 1988, Pat. No. 4,901,300.

[30] Foreign Application Priority Data

May 8, 1989 [NL] Netherlands .......................... 8901145

[51] Int. Cl.⁶ .............................................. G11B 7/00
[52] U.S. Cl. ........................................ 369/32; 369/47; 369/48; 369/116
[58] Field of Search .................. 369/32, 48, 111, 44.1, 369/47, 59, 50, 116

[56] References Cited

U.S. PATENT DOCUMENTS

| | | | |
|---|---|---|---|
| 4,363,116 | 12/1982 | Kleuters et al. | 369/44.41 |
| 4,375,088 | 2/1983 | de Haan et al. | 369/44.41 |
| 4,631,713 | 12/1986 | Romeas et al. | 369/116 X |
| 4,809,251 | 2/1989 | Collomby et al. | 369/32 |
| 4,901,300 | 2/1990 | Van Der Zande et al. | 369/47 |
| 4,907,216 | 3/1990 | Rijnsburger | 369/275 |
| 4,924,781 | 5/1990 | Span | 108/22 |
| 4,999,825 | 3/1991 | Raaymakers et al. | 369/44.26 |
| 5,001,692 | 3/1991 | Fasla et al. | 369/48 |
| 5,023,856 | 6/1991 | Raaymakers et al. | 369/32 |
| 5,060,219 | 10/1991 | Lokhof et al. | 369/48 |
| 5,065,388 | 11/1991 | Roth et al. | 369/47 |
| 5,187,699 | 2/1993 | Raaymakers et al. | 369/48 |

FOREIGN PATENT DOCUMENTS

| | | |
|---|---|---|
| 265695 | 4/1988 | European Pat. Off. . |
| 265984 | 4/1988 | European Pat. Off. . |
| 0299573 | 1/1989 | European Pat. Off. . |
| 288114 | 10/1993 | European Pat. Off. . |
| 61-24397 | 10/1986 | Japan . |
| 8700655 | 5/1988 | Netherlands . |
| 8701632 | 2/1989 | Netherlands . |

OTHER PUBLICATIONS

"Principles of Optical Disc Systems" Adam Hilgar Ltd., Bristol and Boston, pp. 210–227, (Chapter 6, Materials For On-line Optical Recording), 1985.

*Primary Examiner*—Georgia Y. Epps
*Assistant Examiner*—Nabil Hindi
*Attorney, Agent, or Firm*—Richard A. Weiss

[57] ABSTRACT

A recording device, record carrier, and information recording system including both. The recording device is adapted to read an auxiliary signal from the record carrier. The record carrier has a track which is transversely modulated in accordance with the auxiliary signal. The auxiliary signal includes address codes which specify addresses at which those codes are located on the track, and auxiliary codes which specify control data for use by the recording device when recording an information signal on the track. The address codes and auxiliary codes are distinguishable from each other and can be extracted by the recording device.

34 Claims, 5 Drawing Sheets

RECORDING DEVICE, A RECORD CARRIER HAVING PREFORMATTED ADDRESS CODES AND AUXILIARY CODES PROVIDING CONTROL DATA FOR USE BY THE RECORDING DEVICE, AND AN INFORMATION RECORDING SYSTEM INCLUDING BOTH THE RECORDING DEVICE AND THE RECORD CARRIER

CROSS REFERENCE TO RELATED APPLICATIONS

This is a continuation of application Ser. No. 07/518,883, filed May 4, 1990 and now abandoned, which was a continuation-in-part of a application Ser. No. 07/287,941, filed Dec. 20, 1988 and issued as U.S. Pat. No. 5,060,219 on Oct. 22, 1991, and application Ser. No. 07/453,545, filed Dec. 20, 1989 and now abandoned, the latter of which was a continuation-in-part of application Ser. No. 265,638, filed Nov. 1, 1988 and issued as U.S. Pat. No. 4,901,300 on Feb. 13, 1990.

BACKGROUND OF THE INVENTION

The present invention relates to a recording device and record carrier for use in an information-recording system the record carrier having a track in which an auxiliary signal comprising address codes is recorded as a preformed transverse modulation of the track, the address codes specifying the addresses of the track portions at which said codes are located. The recording device comprises read means for reading the preformatted auxiliary signal.

An information recording system of this general type is known from Netherlands Patent Application NL-A-8700655 corresponding to U.S. Pat. No. 5,023,856.

Since an uninterrupted track is available for recording in the known this conventional system, it is very suitable for recording EFM-modulated signals, such as for example a CD audio signal, in a desired track portion whose beginning can be specified by means of a specific address code.

If the known this conventional information-recording system is to be used for recording a CD signal on a record carrier in such a way that the record carrier can be read by existing read apparatus for read-only CD audio discs or CD-ROM discs, it is desirable that the radial positions of the beginnings of the lead-in area and the program area as prescribed by the CD standard can be detected accurately. Moreover, it is desirable that prior to the beginning of the recording process the overall playing time of the record carrier be known. This is desirable in particular if standard CD signals are to be recorded, in which case the program area should end at a lead-out portion of the track in which a specific lead-out signal is recorded. In order to obtain a lead-out track portion of an appropriate length, it should begin at an adequate distance before the end of the track.

Apart from the aforementioned information, it may be desirable, for the purpose, that of controlling the recording process other control data, which may vary considerably from disc to disc, be known prior to recording as well. For example, the write energy for recording on the recording materials. Since it may differ substantially for different types or recording materials.

SUMMARY OF THE INVENTION

It is an object of the invention to provide an information-recording system in which the data required for recording can be obtained in a simple manner. To this end the information-recording system as the type previously described is characterized in that in addition to address codes the auxiliary signal also comprises auxiliary codes which can be distinguished from the address codes. The recording device comprises a device for selectively extracting the address codes and the auxiliary codes from the auxiliary signal, and the auxiliary codes comprise control data for controlling the recording process, wherein the recording device is adapted to control the recording process in dependence upon the extracted auxiliary codes.

A further illustrative embodiment of the recording system is characterized in that the address codes and the auxiliary codes have the same data format. By selecting equal formats, it enables the signal read for the address codes and the auxiliary codes to be processed largely by the same hardware.

An illustrative embodiment of the device is characterized in that one of the address codes or one of the auxiliary codes contained in the auxiliary signal one is recorded at equidistant locations in the track, the address codes indicating the distance, measured in the track direction, between the location where they have been recorded and a specific reference position. The recording device comprises synchronising circuitry for deriving a clock pulse signal from the auxiliary signal being read, which clock signal is in synchronism with the process of reading the equidistantly recorded address and auxiliary codes, a counter, whose count is controlled by the clock signal, and circuitry responsive to a correctly read address code to reset the count to a value corresponding to such address code.

In this illustrative embodiment, the counter is always indicative of the correct address of the track portion from which the auxiliary signal is read, This has the advantage that the track portions, in which an auxiliary code instead of an address code has been recorded will remain addressable, A further illustrative embodiment of the information recording system has an advantage, which technically can be realized very easily from the fact, that the control data required for recording can be provided by means of the transverse track modulation. This is in contrast with the recording of this data by means of, for example, track depth modulation, such as in the form of a pit structure, which is technically far more difficult. The information recording system in accordance with the invention is particularly advantageous when a number of different predetermined radial positions must be identified when information is to be recorded on a record carrier having a concentric track pattern. This is the case, for example, when information is to be recorded in conformity with the CD standard, in which case the information signals must be recorded in a program area which begins at a radial position prescribed by the standard and a table of contents specifying the addresses of specific portions of the recorded information must also recorded in an area which begins at a prescribed radial position. In such a case, a predetermined address can be assigned to one of the radial positions, while the addresses of track portions having the other radial positions can be indicated by means of auxiliary codes.

In another illustrative embodiment of the information recording system, which is also very suitable for standard CD signals, the address of the most extreme location at which recording of the lead out track portion should start is incorporated in the auxiliary signal. Thus, by means of the auxiliary signal being read, the recording device can determine the track portion where recording of the lead-out signal must commence, in such a way that the beginning of the lead-out track portion will be situated before the most extreme address specified in the auxiliary signal.

BRIEF DESCRIPTION OF THE DRAWING

Further embodiments and advantages thereof will now be described in more detail, by way of example, with reference to FIGS. 1a, b, c and FIGS. 2 through 9, in which FIGS. 1a, b, c and d show a record carrier provided with a servo-track which exhibits a track modulation.

DETAILED DESCRIPTION OF THE PREFERRED EMBODIMENTS

Figures 1A, 1B:
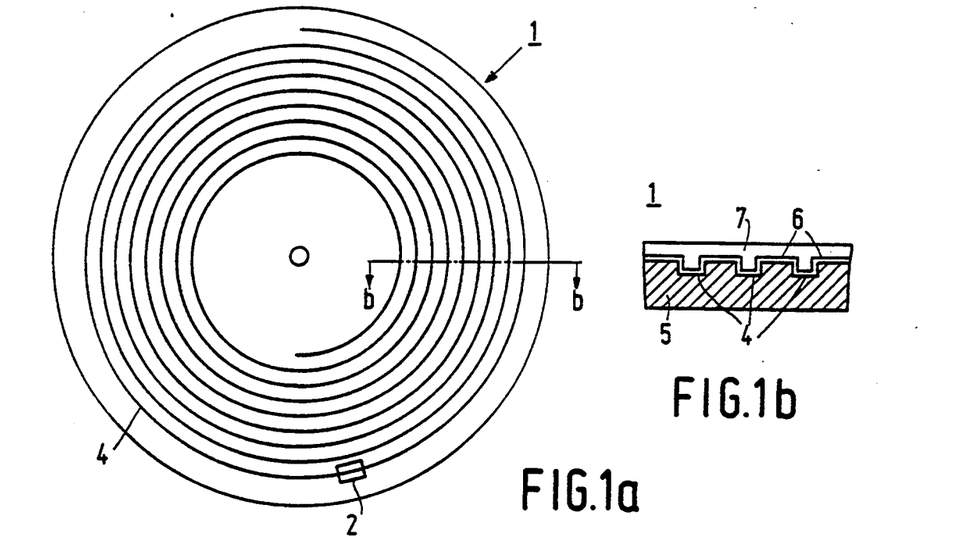
Figure 1C:
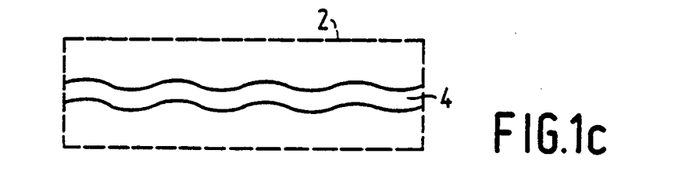
Figure 1D:
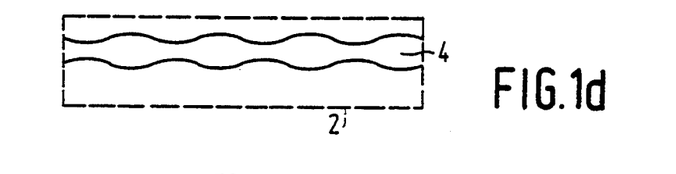

FIGS. 1a, b, c and d show possible embodiments of a record carrier 1 of an inscribable type as described, for example, in Netherlands Patent Application NL-A-8800152 corresponding to U.S. Pat. No. 4,999,825. FIG. 1a is a plan view. FIG. 1b shows a small part of a sectional view taken on the line b—b. FIGS. 1c and 1d are greatly enlarged plan views of a part 2 of a first embodiment and a second embodiment of the record carrier 1. The record carrier 1 has a track 4, constituted, for example, by a preformed groove or ridge. The track 4 is intended for recording an information signal. For the purpose of recording, the record carrier 1 has been provided with a recording layer 6 deposited on a transparent substrate 5 and coated with a protective layer 7. The recording layer 6 is of a material which, when exposed to suitable radiation of adequate intensity, is subjected to an optically detectable change. Such a layer may be, for example, a thin layer of a metal such as tellurium. By exposure to laser radiation of suitable intensity, this metal layer can be melted locally, so that at this location the layer will have a different reflection coefficient. When the track 4 is scanned by a radiation beam whose intensity is modulated in conformity with the information to be recorded, an information pattern of optically detectable recording marks is obtained pattern is indicative of the information.

The layer may alternatively consist of other radiation-sensitive materials, for example, magneto-optic materials, a dye, or materials which upon heating are subjected to a structural change, for example, from amorphous to crystalline or vice versa. A survey of such materials is given in the book "Principles of optical disc systems", Adam Hilgar Ltd., Bristol and Boston, pp. 210–227.

The track 4 enables a radiation beam which is aimed at the record carrier 1 for the purpose of recording the information to be positioned accurately on the track 4, in other words, it enables the position of the radiation beam in a radial direction to be controlled via a tracking system employing the radiation reflected from the record carrier 1. The measurement system for measuring the radial position of the radiation spot on the record carrier may correspond to one of the systems as described in the above mentioned book "Principles of optical disc systems".

The auxiliary signal is recorded in the track 4 by means of a preformed track modulation, suitably in the form of a sinusoidal track excursion as shown in FIG. 1c. However, other track modulations, such as, for example, track width modulation (FIG. 1d) are also suitable. Since a track excursion is very easy to obtain in the manufacture of the record carrier, it is preferred to use a track modulation in the form of such a track excursion.

It is to be noted that FIGS. 1c and 1d show the track modulation to a highly exaggerated scale. In reality, it is found that in the case of a track width of approximately $10^{-6}$ meters an excursion having an amplitude of approximately $30.10^9$ meters is adequate for a reliable detection of the scanning beam modulation. An excursion of small amplitude has the advantage that the distance between adjacent servo tracks can be small. FIG. 1b also shows the track pitch (the spacing between the track centers) to a substantially larger scale than actually used. In practice, the track pitch is approximately $1.6 \; 10^{-6}$ meters.

An attractive track modulation is that in which the frequency of the track modulation is modulated in conformity with the auxiliary signal. However, other track modulations such as the type described in Netherlands Patent Application NL-A-8701632 corresponding to U.S. Pat. No. 4,907,216, are also possible.

Figure 2:
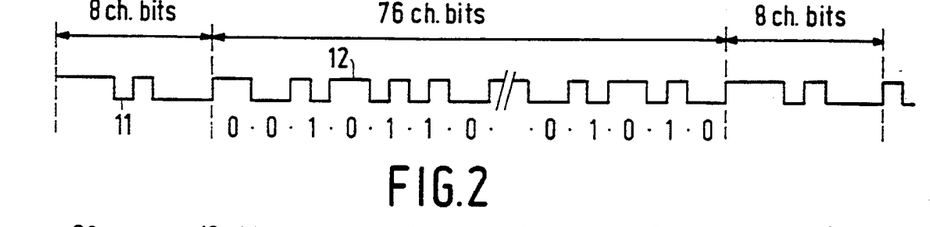
FIG. 2 illustrates a suitable format for an auxiliary signal which is recorded in the servo track by means of the track modulation, FIG. 3 gives a code word represented by the auxiliary signal.

FIG. 2 provides an example of a suitable auxiliary signal comprising code signals 12 which alternate with synchronized signals 11. Each code signal 12 may comprise a "biphase-mark" modulated signal having a length of 76 channel bits, which signal is representative of a code word comprising 38 code bits. In the case of a "biphase-mark" modulated signal, each code bit is represented by two successive channel bits. A code bit of a first logic value, in the present example "0", is represented by two bits of the same logic value. The other logic value ("1") is represented by two channel bits of different logic values. Moreover, the logic value of the "biphase-mark" modulated signal changes after every pair of channel bits (see FIG. 2), so that the maximum number of successive bits of the same logic value is two at the most. The synchronized signals 11 are selected in such a way that they can be distinguished from the code signals 12. This is achieved when the maximum number of successive bits of the same logic value in the synchronized signals 11 is selected to be three.

Figure 3:
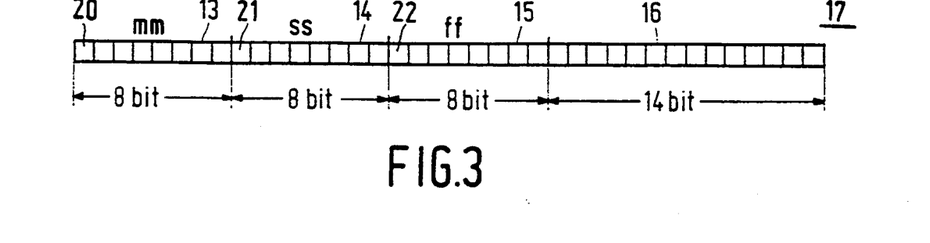
Figure 7:
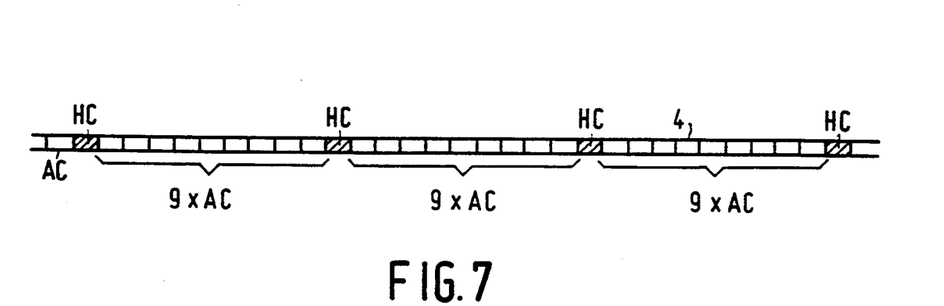
FIG. 7 shows a track portion in which the positions of the recorded auxiliary codes and address codes are indicated diagrammatically.

FIG. 3 shows a suitable format of 38-bit code words 17 represented by the code signals 12. The code word 17 shown therein comprises three bytes 13, 14 and 15 of 8 bits each and a 14-bit group 16. The most significant bits of the bytes 13, 14 and 15 bear the reference numerals 20, 21 and 22 respectively. The bytes 13, 14 and 15 are used as information bytes and the 14-bit group 16 comprises parity bits for the purpose of error detection. The values represented by the bytes 13, 14 and 15 are referenced mm, ss and ff, respectively. Preferably, the 38-bit code words are recorded in the track at equidistant positions and comprise address codes AC and auxiliary codes HC which can be distinguished from each other and which are recorded in the track, for example, in the sequence illustrated in FIG. 7. In FIG. 7 a constant number, in the present case 9, of address codes AC is always followed by an auxiliary code HC. However, it is to be noted that the number of address codes AC between the auxiliary codes HC may also be variable instead of constant. The address codes may comprise for example, a time code, indicating the time required, when the track 4 is scanned at the nominal scanning speed, to bridge the distance between a reference position in the track and the location where the address code is recorded. Preferably the selected address code is a time code identical to the absolute time code as included in the subcode Q-channel during recording of a CD signal. In that case, the value mm specifies a number of minutes and the values ss and ff denote a number of seconds and a number of frames respectively, the specified number of seconds varying between 0 and 59 and the specified number of frames varying between 0 and 74. The number of minutes, seconds and frames may, for example, BCD encoded in the bytes 13, 14 and 15.

The advantage of the address code described above becomes apparent in particular in the case in which a signal is to be recorded on the record carrier in standard CD format. In that case, the absolute time code to be included in the subcode Q-channel can be derived directly from the address code being read, as is described in the above-referenced detail in Netherlands Patent Application NL-A-880152 corrseponding to U.S. Pat. No. 4,999,825.

Figure 4:
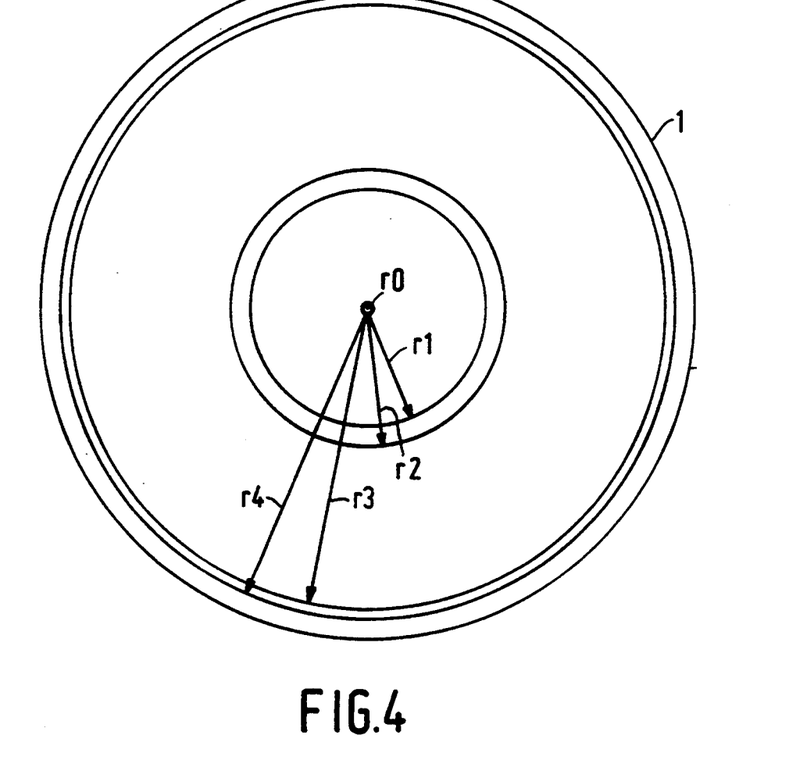
FIG. 4 shows a layout of a record carrier on which a standard CD signal has been recorded, FIG. 5 gives the address codes as a function of the radial position of the track portions in which they are recorded, FIG. 6 gives a number of bit combinations used in the auxiliary codes and address codes.

When a standard CD signal is recorded three different areas can be distinguished on the record carrier, as is illustrated in FIG. 4, namely:

1) a program area situated between the radial positions bounded by the radii r2 and r3. In this area the data signals are recorded;
2) a lead-in area situated between the radial positions bounded by the radii r1 and r2. This area comprises a lead-in track in which the addresses of the different data signals in the program area are stored in the form of a table of contents, as is described, for example, in Netherlands Patent Application NL-A-8900766, which corresponds to U.S. Pat. No. 5,065,388 incorporated herewith by reference and;
3) a lead-out area situated between the radial positions bounded by the radii r3 and r4. This area comprises a lead-out track in which a lead-out signal which can be distinguished from the data signals is recorded to mark the end of the program area.

The radial positions of the beginning of the lead in area and the beginning of the program area are prescribed by the CD standard, the required distance from the beginning of the lead in area to the center of rotation r0 being 23 mm, while the distance from the beginning of the program area to the center of rotation r0 should be 25 mm. Moreover, the lead-out area is required to begin before a predetermined radial position.

In the CD signal, the beginning of the program area is indicated by the absolute time code 00:00:00 in the subcode Q-channel. In the program area the absolute time code on the track also starts with a value 00:00:00.

For an optimum use of the address code recorded by means of the track modulation, it is desirable that the values of the address codes recorded in the track correspond identically to the absolute time code in the CD signal to be recorded. This means that the value of the address code in track portion whose the radial position is indicated by r2 is 00:00:00. Preferably the value of the address code in the lead-in area increases to a value 99:59:74 at the end of this area. This has the advantage that the value 00:00:00 of the first address code in the program area directly follows the value 99:59:74 of the last address code in the lead-in area. The resulting variation of the values of the address codes is denoted by the reference numeral 50 in FIG. 5.

Figure 5:
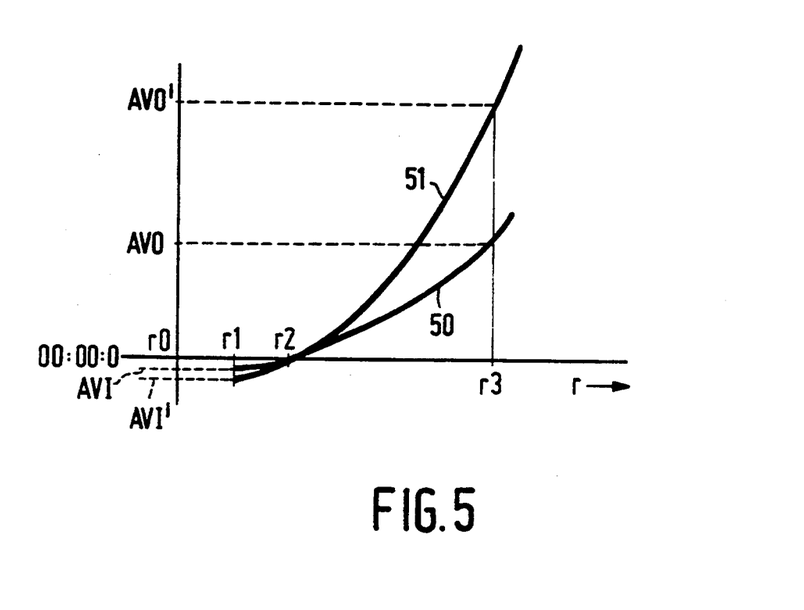

The value of the address code at the radial position indicated by r1 is referenced AVI and the value of the address code at the radial track position defined by r3 is referenced AVO.

It is to be noted that the values of the address codes at the radial positions defined by the radii r1 and r3 depend strongly on the track pitch and the nominal scanning speed, which may be selected between 1.2 and 1.4 m/s in conformity with the CD standard. Indeed, the total track length between two radial positions is inversely proportional to the track pitch and the normal scanning speed. By way of illustration, a line 51 in FIG.5 shows the variation of address code value for a comparatively small track pitch or a low scanning speed. The associated values of the address codes at the radial positions defined by r1 and r3 are referenced AVI' and AVO', respectively. As is apparent from FIG. 5, the address codes at the radial positions defined by r1 and r3 do not correspond for different record carriers on account of the permissible differences in track pitch and scanning speed in accordance with the CD standard. However, for recording CD signals in conformity with the CD standard, it is desirable that the address codes at the radial positions defined by r1 and r3 can be determined accurately. This can be achieved, for example, by marking the radial positions defined by r1 and r3 with specific auxiliary codes recorded in the track at these radial positions. However, it is preferred that auxiliary codes be recorded in the track in the actual lead-in area and/or program area, which refer to the address codes of the values AVI and AVO, which define radial positions indicated by r1 and r3. For a given track pitch and scanning speed, the values of AVI and AVO can be pre-calculated and can thus be recorded during recording of the servo track in the mastering process.

This can be achieved simply by including the values of AVI and AVO in the auxiliary codes HC shown in FIG. 7. The last mentioned possibility is to be preferred because in that case the positions where the auxiliary codes are recorded can be selected freely. Moreover, it is then possible to divide the auxiliary codes containing the values AVI and AVO uniformly along the track, so that the auxiliary codes with the references to AVO and AVI can always be found rapidly.

As already stated, it should be possible for the auxiliary codes and the address codes to be distinguished from one another. This can be achieved, for example, if the code signals representing the address codes and the code signals representing the auxiliary codes are preceded by different synchronization signals 11. A number of different synchronization signals 11 which may be used in conjunction with the code signals 12 described herein are described inter alia in Netherlands Patent Application NL-A-8801275, which corresponds to U.S. Pat. No. 5,060,219.

However, the auxiliary codes can also be distinguished from the address codes if the auxiliary codes contain specific bit combinations which do not occur in the address code. If the time codes described above are used for the address codes, this is possible by using of a bit combination comprising the most significant bits 20, 21 and 22 for the three bytes 13, 14 and 15, which will now be explained with reference to FIG. 6.

Figure 6:
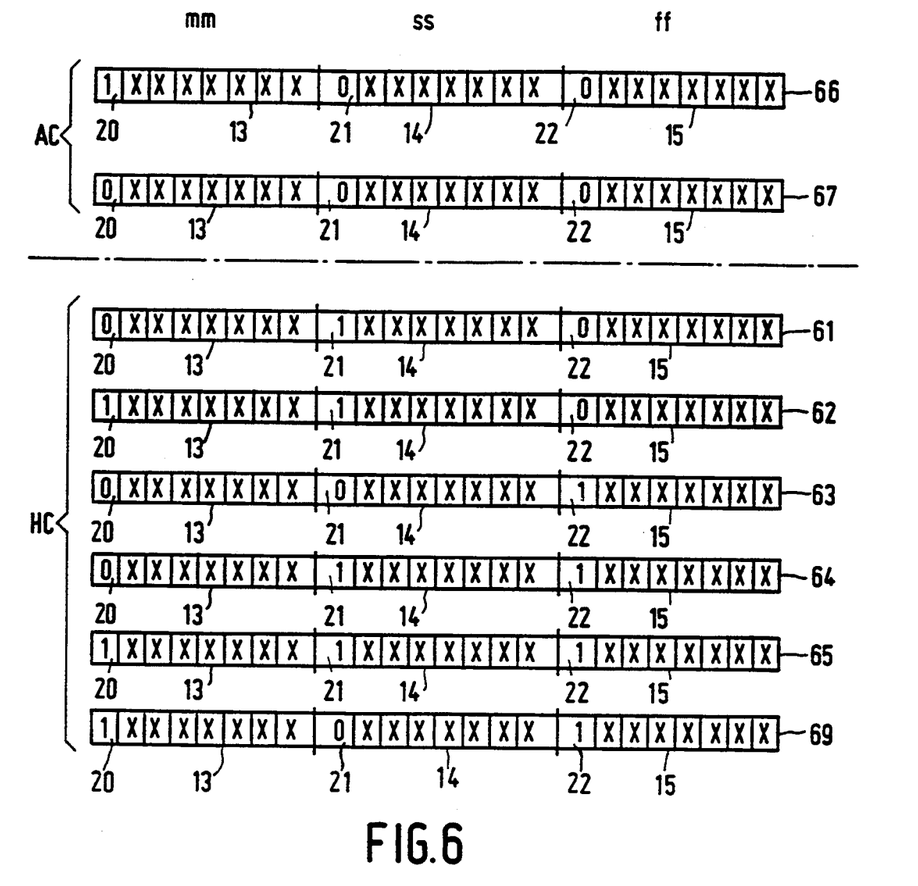

In FIG. 6, the reference numeral 66 denotes possible bit combinations of the address codes in the lead-in area. On account of the high value mm of the byte 13 in the lead-in area, the most significant bit 20 of the byte 13 in this area will always have the logic value 1. The value ss of the byte 14 varies between 0 and 59, which in the case of the BCD encoding means that the most significant bit 21 of the byte 14 always has the logic value 0. The value ff of the byte 15 varies between 0 and 74, so that the most significant bit 22 for the byte 15 also always has the logic value 0. The other bits of the bytes 13, 14 and 15 in the bit combination 66 may assume either the logic value 0 or the logic value 1, which is indicated by the symbol "x".

The reference numeral 67 denotes the possible bit combinations of the bytes 13, 14 and 15 of the address code in the programs area of the track portion situ%ted outside the lead in area. For the same reasons as in the case of the address code in the lead in area, the most significant bits 21 and 22 of the bytes 14 and 15 in all of the bit combinations 67 always have the logic value 0. Moreover, on account of the limited playing time of the record carriers address codes having a value for which the most significant bit 20 in the bit combination 67 assumes the value 1 do not occur in the program area.

The reference numerals 61, 62, 63, 64, 65 and 69 represent a number of bit combinations for which the combination of the most significant bits 20, 21 and 22 of the bytes 13, 14 and 15 differ from the corresponding bit combinations in the address codes. Therefore, such bit combinations may be used for the auxiliary codes HC, in which case the seven least significant bits of the bytes 13, 14 and 15 can represent additional information. For example, the bit combinations 61, with most significant bits 20, 21 and 22 of bytes 13, 14 and 15 being equal to 0,1 and 0, respectively, can be employed to represent the address code of the value AVO. Since the most significant bits of the bytes 13, 14 and 15 of the address codes for AVO always assume the same logic 0 value, the value of AVO may be represented completely by the seven least significant bits of the bytes 13, 14 and 15 in the bit combination 61.

Similarly, the value AVI may be represented by the bit combination 62. The bit combinations 63, 64 and 65 can be employed for auxiliary codes with which other additional information is recorded in the track, such as, for example, the write energy required for recording, the type of record carrier, the write strategy etc.

Figure 8:
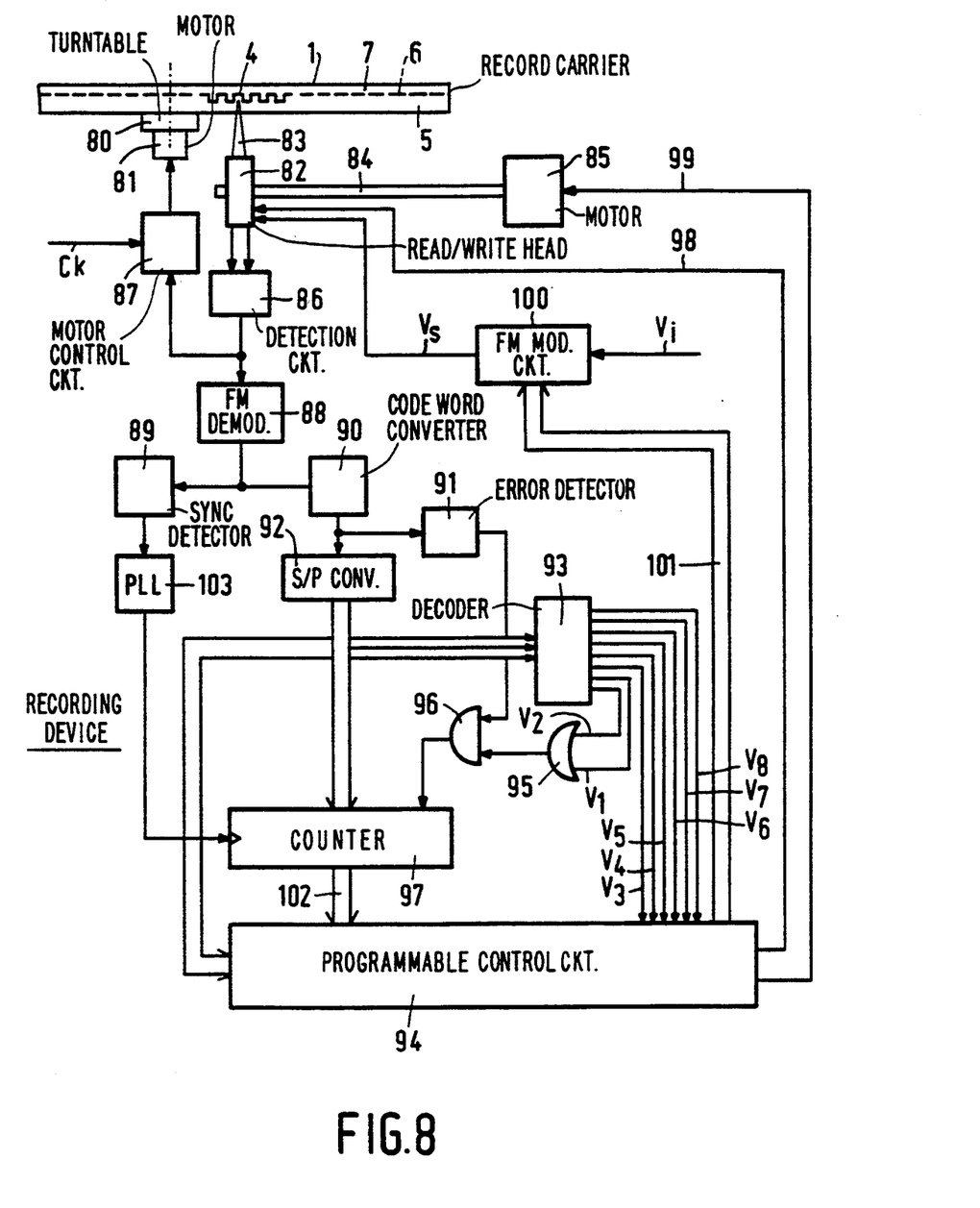
FIG. 8 shows an embodiment of an information-recording system in accordance with the invention.

FIG. 8 depicts an illustrative embodiment of a recording device for recording data signals Vi on the record carrier 1 described above. The record carrier 1 is placed on a turntable 80, which is rotated by means of a motor 81. An optical write/read head 82 of a customary type is arranged opposite the carrier 1 to read and/or record information from/in the track 4 by means of a radiation beam 83 which is aimed at the recording layer 6. The read head 82 is movable in a radial direction relative to the record carrier 1 by means of a system which comprises, for example, a motor 85 and a spindle 84. The beam 83 is focused on the recording layer 6 in a customary manner and is kept on the track 4 with the aid of customary focusing and tracking systems, not shown. As the track is scanned, the beam is modulated in conformity with the preformed track modulation. In read head 82, the beam, which is modulated, is detected by customary radiation-sensitive detectors, which generate signal currents from which a detection signal Vd is derived by a detection circuit 86 in a manner as described, for example, in Netherlands Patent Application NL-A-8700655, the frequently of the detection signal corresponding to the frequency of the track modulation. The detection signal Vd is applied to a motor control circuit 87 to control the speed of the motor in such a way that the mean frequency of the detection signal Vd remains equal to the frequency of a reference clock signal Ck. The motor control circuit 87 may comprise, for example, a phase detector for detecting the phase difference between the detection signal Vd and the reference clock signal Ck, and a power supply circuit for powering the motor with a voltage whose value depends on the phase difference detected.

The detection signal Vd is also applied to an FM demodulator 88 to recover the auxiliary signal Vh from the detection signal Vd. The recovered auxiliary signal Vh is applied to a synchronization-signal detection circuit 89 for detecting the synchronizing signals 11 in the auxiliary signal Vh and a "biphase-mark" demodulator 90 for converting the auxiliary signals into the 38-bit code words 17. The bits of the 38-bit code words 17 are serially applied to an error-detection circuit 91, which by means of the parity bits of the bit group 16 determines whether the code word is received without errors. Moreover, the serially supplied code words 17 are applied to serial-parallel converter 92, on whose output the bits of the bytes 13, 14 and 15 are available in parallel form. The most significant bits 20, 21 and 22 of the 3 bytes 13, 14 and 15 produced at the outputs of the converter 92 are fed to a customary decoder circuit 93, which generates eight signals V1, V2, V3, V4, V5, V6, V7, V8, the relationship between the signals V1, ... V8 and the most significant bits 20, 21 and 22 of the bytes 13, 14 and 15 being given in the following Table 1.

TABLE 1

|    | MSB |    |    |
|----|-----|----|----|
|    | 20  | 21 | 22 |
| V1 | 1   | 0  | 0  |
| V2 | 0   | 0  | 0  |
| V3 | 0   | 1  | 0  |
| V4 | 1   | 1  | 0  |
| V5 | 0   | 0  | 1  |
| V6 | 0   | 1  | 1  |
| V7 | 1   | 1  | 1  |
| V8 | 1   | 0  | 1  |

The signals V3, V4, V5, V6, V7 and V8 are applied to a control circuit 94 for controlling the recording device. The control circuit 94 may comprise a microcomputer of a customary type, which is loaded with suitable control program to be described hereinafter. The signals V1 and V2 on the output of the decoder circuit 93 are applied to a two-input OR gate 95. The signals V1 and V2 indicate that the bytes 13, 14 and 15 on the output of the converter 92 represent an address code within the lead-in area or an address code outside the lead-in area, so that the output signal of the OR gate 95 always indicates whether the output signal of the converter 92 concerns address information. The output signal of the OR gate 95 is applied to an input of the two-input AND gate 96. A signal from the error-detection circuit 91, which signal, each time, indicates by means of a pulse that the received code word 17 is correct, is applied to the other input of the AND gate 96.

Thus, by means of that pulse, the AND gate 96 indicates, each time whether the information on the output of the converter represents a correctly read address code. The output signal of the AND gate 96 is applied to a parallel load-enable input of a counting circuit 97. The bytes 13, 14 and 15 appearing on the outputs of the converter 92 are applied to the parallel inputs of the counting circuit 97, so that upon every receipt of a correctly read address code the counting circuit 97 is loaded with the address code being read. The counting circuit 97 is of a type which, in response to a clock pulse on a clock input of the counter, increments the count of the counter by one. A clock signal which is in synchronizm with the synchronization signals 11 being read is applied to the clock input, which clock signal is derived from an output signal of the synchronizing signal detection circuit 89 by a customary phase locked loop circuit 103.

The counting circuit 97 operates as follows. In response to the clock signal pulses supplied by the phase locked loop circuit 103, the count is, each time, incremented by one in synchronizm with the operation of reading the code values recorded in the track. This means that as soon as the count has a value corresponding to the address codes being read the value of the count will follow the values of the address code being read, regardless of whether the subsequent address codes are read incorrectly or the next code word 17 being read does not contain an address code AC but an auxiliary code HC. If at the beginning the count does not correspond to the address code being read, the counter is responsive to the next pulse on the output of the AND gate 96 to be loaded with the correct value supplied by the converter 92 via its parallel inputs.

As long as the count corresponds to the address code being read, the pulses on the output of the AND gate will have no effect because the count already corresponds to the address code applied to the parallel inputs of the counting circuit. This method of deriving the address codes has the advantage that an address code corresponding to the position of the track being scanned is always available, even in the case where instead of an address code AC an auxiliary code HC is recorded in the track. This also means that the track portions in which the address codes are recorded remain addressable. The bytes 13, 14 and 15 on the output of the converter 92 are applied not only to the parallel inputs of the counting circuit 97 but also the the control circuit 94.

Moreover, the control circuit 94 is coupled to the write/read head 82 and the motor 85 via signal lines 98 and 99. The read head can be set to a read mode or a write mode via the signal line 98. In the read mode, the intensity of the radiation beam 83 remains at a constant small value, which is too small to bring about the optically detectable change in the recording layer 6. In the write mode, the intensity of the radiation beam is switched in accordance with a write signal Vs between a lower intensity level, which does not bring about an optically detectable change, and a high intensity level (also referred to as write energy), which gives rise to an optically detectable change in the recording layer 6, so that an optically detectable pattern corresponding to the write signal Vs is formed in the recording layer 6. The write signal Vs is generated by an EFM modulation circuit 100, which converts a data signal Vi and the subcode information supplied via a bus 101 into an EFM modulated signal in conformity with the CD standard, from which the write signal Vs is derived in a manner as described in detail in, for example, Netherlands Patent Application NL-A-8700934(PHQ 87.009). Moreover, the high write level (write energy) can be set to a value indicated in the auxiliary code via signal line 98.

The process of recording information on the record carrier is controlled by the control circuit 94, which for this purpose is loaded with a suitable control program. Such a control program may comprise, for example, the steps indicated in the flow chart in FIG. 9.

Figure 9:
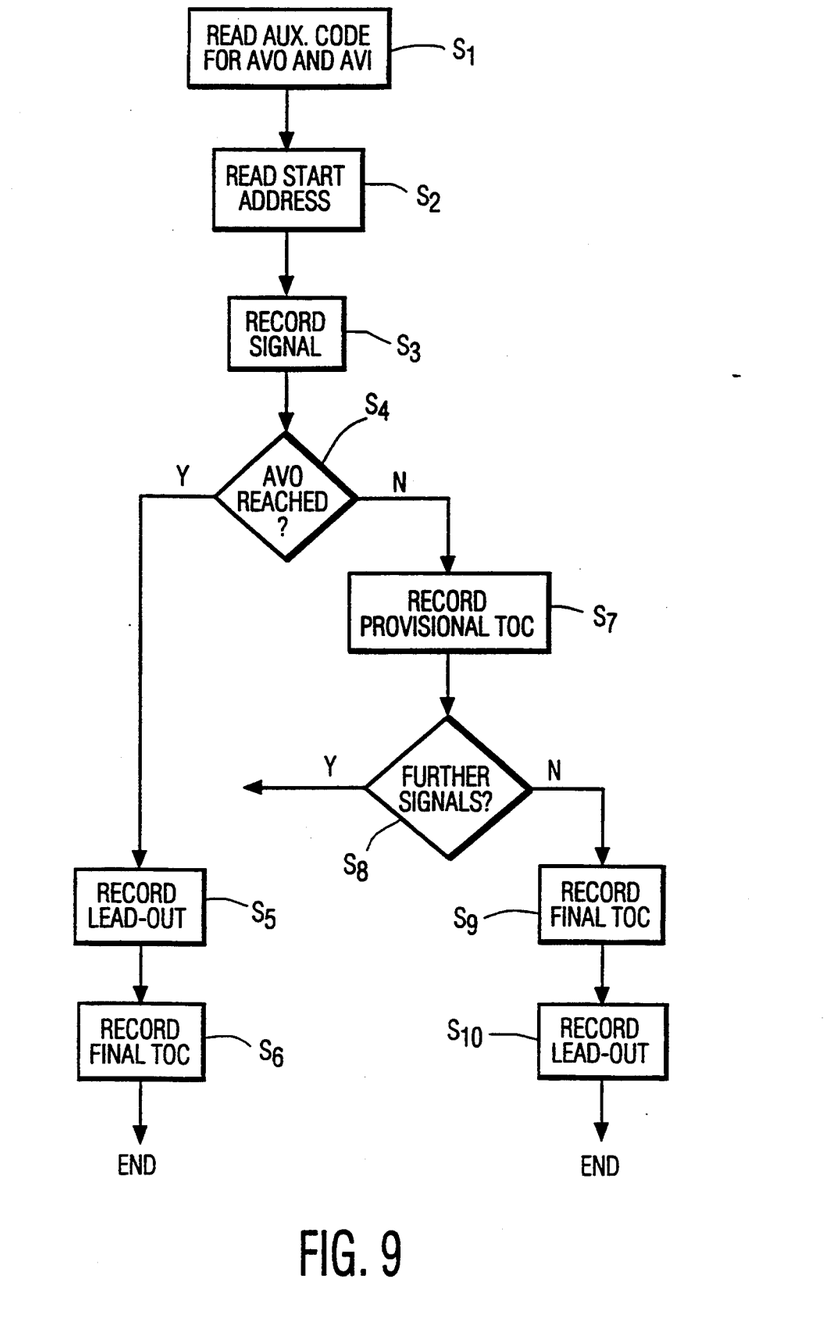
FIG. 9 is a flow chart of a control program for controlling the process of recording information by means of the information-recording system shown in FIG. 8.

Step S1 is performed immediately after the record carrier 1 has been loaded into the recording device. In this step S1, the read/write head 82 is set to the read mode, and by means of the signals V3 and V4 of the output of the decoder circuit 93 a determination is made as to whether the code word supplied to the output of the converter 92 comprises an auxiliary code containing the address value AVO or AVI. When the presence of either of these auxiliary codes is detected, the value of AVO or AVI is stored in a memory of the control circuit.

Subsequently, in step S2, the read/write head 82 is directed towards the track portion containing the address code of the value AVI. By means of the table of contents recorded in this track portion, the start address of the program area is determined before recording of the next data signal can commence. The manner in which the start address can be specified in such a table of contents is described in detail in the above-referenced Netherlands Patent Application NL-A-8900766. That Patent Application describes how a provisional table of contents can be recorded in the lead-in area. As soon as all the desired data signals have been recorded, a definitive table of contents is recorded in the lead-in area in a manner as prescribed by the CD standard.

In step S3 the read/write head 82 is directed towards the track portion having the start address specified in the provisional table of contents by means of the address codes being read. When this track portion is reached, the read/write head 82 is set to the write mode, after which the data signal Vi applied to the EFM modulation circuit 100 can be recorded. For the absolute time codes to be inserted into the subcode Q-channel of the recorded signal, the counts of the counting circuit 97 may be used. The Counts are read by the control circuit 94, via a bus 102, and which are, subsequently, applied to the EFM modulation circuit 100, via the bus 101. Moreover, the value of each count being read is compared with the value AVO, and if the count is larger than or equal to the value AVO recording of the data signal is discontinued. Recording is also terminated once the complete data signal to be recorded has been recorded. Upon termination of the recording process step S4 is performed. In that stop, a determination is made as to whether recording has been discontinued as a result of the track portion specified by the value AVO being reached. If this is the case, step S5 is performed, in which the lead-out signal is recorded during a predetermined time interval, the subcode information characterizing the lead-out signal being applied to this portion of the EFM modulation circuit by the control circuit 94. After recording of the lead-out signal, the write/read head 82 is directed towards the lead-in area in step S6 to record the definitive table of contents in the lead-in area.

If during step S4 it is determined that recording of the data signal has not been discontinued as a result of the track portion having the address code with the value AVO being reached, the provisional table of contents is recorded in the lead-in area during step S7. Subsequently, in step S8, a determination is made as to whether further data signals are to be recorded on the record carrier. If this is the case, the program is terminated. If this is not the case, the definitive table of contents is recorded in the lead-in area in step S9 and the lead out signal is recorded in step S10, after which the program is terminated.

In the foregoing, the invention has been described in terms of an application for an optical recording system for recording a standard CD signal on a record carrier comprising substantially concentric tracks. However, it is to be noted that the invention and its principles equally applies to the recording of signals in linear tracks. In addition, the invention may also be applied to the recording of other data signals than CD signals. Moreover is the scope of the invention is not limited to optical recording systems. It may equally be applied to magneto-optical recording systems or magnetic recording systems where address codes have been recorded in the track by means of a previously applied track modulation.

What is claimed is:

1. An information recording system, comprising:
a record carrier having a preformed recording track which is transversely modulated in accordance with an auxiliary signal which includes successive address codes specifying addresses of successive track portions at which said address codes are located and auxiliary codes, arranged among said address codes, specifying control data for use by the recording system, said auxiliary codes having identifying indicia which distinguishes them from said address codes; and
a recording device comprising read means for reading said auxiliary signal from said track, recording means for recording an information signal on said track, means for selectively extracting said address codes and said auxiliary codes from said auxiliary signal read from said track, and control means for controlling said recording means in accordance with said control data specified by said auxiliary codes.

2. The information recording system as claimed in claim 1, characterized in that said address codes and said auxiliary codes have the same data format.

3. The information recording system as claimed in claim 1, wherein said address codes include absolute time codes specifying said distances as playing time of said record carrier from said reference position.

4. The information recording system as claimed in claim 2, wherein said auxiliary codes are distinguished from said address codes in that said auxiliary codes comprise bit combinations which do not occur in said address codes.

5. The information recording system as claimed in claim 2, wherein said recording means is adapted to produce a write beam of radiation having an energy level for recording said information signal on said track; said control data specifies a desired energy level for said write beam; and said control means is adapted to cause said recording means to adjust the energy level of said write beam to said desired energy level.

6. The information recording system as claimed in claim 1, wherein said address codes and said auxiliary codes are arranged in said auxiliary signal such that there are codes at equidistant locations on said track, said address codes indicating distances, as measured in the track direction, between locations at which they are located and a specific reference position; and said recording device further comprises:
synchronizing means for deriving a clock signal from said auxiliary signal being read, said clock signal being in synchronism with the codes at equidistant locations on said track;
a counter which counts in response to said clock signal; and
means responsive to said address codes extracted from said auxiliary signal to reset said counter in accordance with said address codes during reading of said auxiliary signal from said track.

7. The information recording system as claimed in claim 1 wherein said track is transversely modulated such that there is a periodic excursion of said track transverse to the track direction, said excursion having a frequency in conformity with said auxiliary signal; said read means is adapted to detect said excursion and produce a corresponding frequency modulated detection signal; and said recording device further comprises means for demodulating said detection signal to thereby recover said auxiliary signal.

8. The information recording system as claimed in claim 1, wherein said track portions are substantially concentric about a common center of rotation and, said address codes indicate the addresses of said track portions in relation to a reference position which is at a predetermined radial distance from said center of rotation.

9. The information recording system as claimed in claim 1, wherein said recording device further comprises means for recording a table of contents on said track giving the address codes of track portions at which particular portions of said information signal are recorded; and means for determining from said auxiliary codes read from said track the location of the track portion at which recording of said table of contents should occur.

10. The information recording system as claimed in claim 9, wherein said recording device further comprises means for recording a lead-out signal indicating the end of said information signal; and means for determining from said auxiliary codes read from said track the location of the track portion at at which recording of said lead-out signal must commence in order to be completed before the end of said track.

11. The information recording system as claimed in claim 9, wherein said recording device further comprises means for recording a lead-out signal indicating the end of said information signal; and means for determining from said auxiliary codes read from said track the location of the track portion at which recording of said lead-out signal must commence in order to be completed before the end of said track.

12. The information recording system as claimed in claim 1, characterized in that said auxiliary codes are distinguishable from said address codes in that said auxiliary codes comprise bit combinations which do not occur in said address codes.

13. A recording device, comprising:
  read means for reading an auxiliary signal from a record carrier having a preformed recording track which is transversely modulated in accordance with said auxiliary signal, said auxiliary signal comprising:
    (i) successive address codes specifying addresses of successive track portions at which said address codes are located; and
    (ii) auxiliary codes, arranged among said address codes, specifying control data for use by the recording device, said auxiliary codes having identifying indicia which distinguishes them from said address codes;
  extraction means for selectively extracting said address codes and said auxiliary codes from said auxiliary signal read from said record carrier;
  recording means for recording an information signal on said track; and
  control means for controlling said recording means in accordance with said control data specified by said auxiliary codes.

14. The recording device as claimed in claim 13, wherein said recording means is adapted to produce a write beam of radiation having an energy level for recording said information signal on said track; said control data specifies a desired energy level for said write beam; and said control means is adapted to cause said recording means to adjust the energy level of said write beam to said desired energy level.

15. The recording device as claimed in claim 13, wherein said address codes and said auxiliary codes are arranged in said auxiliary signal such that there are codes at equidistant locations on said track, said address codes indicating distances, as measured in the track direction, between locations at which they are located and a specific reference position; and the recording device further comprises:
  synchronizing means for deriving a clock signal from said auxiliary signal being read, said clock signal being in synchronism with the codes at equidistant locations on said track;
  a counter which counts in response to said clock signal; and
  means responsive to said address codes extracted from said auxiliary signal to reset said counter in accordance with said address codes during reading of said auxiliary signal from said track.

16. The recording device as claimed in claim 13, wherein said track is transversely modulated such that there is a periodic excursion of said track transverse to the track direction, said excursion having a frequency in conformity with said auxiliary signal; said read means is adapted to detect said excursion and produce a corresponding frequency modulated detection signal; and the recording device further comprises means for demodulating said detection signal to thereby recover said auxiliary signal.

17. The recording device as claimed in claim 13, further comprising means for recording a table of contents on said track giving the address codes of track portions at which particular portions of said information signal are recorded; and means for determining from said auxiliary codes read from said track the location of the track portion at which recording of said table of contents should occur.

18. The recording device as claimed in claim 17, further comprising means for recording a lead-out signal indicating the end of said information signal; and means for determining from said auxiliary codes read from said track the location of the track portion at which recording of said lead-out signal must commence in order to be completed before the end of said track.

19. The recording device as claimed in claim 13, further comprising means for recording a lead-out signal indicating the end of said information signal; and means for determining from said auxiliary codes read from said track the location of the track portion at which recording of said lead-out signal must commence in order to be completed before the end of said track.

20. A record carrier having a preformed recording track which is transversely modulated in accordance with an auxiliary signal, said auxiliary signal comprising:
  successive address codes specifying addresses of successive track portions at which said address codes are located; and
  auxiliary codes, arranged among said address codes, specifying control data for use by a recording device in recording an information signal on said track, said auxiliary codes having identifying indicia which distinguishes them from said address codes.

21. The record carrier as claimed in claim 20, wherein said control data specifies a desired energy level for which a write beam of said recording device should be set in recording said information signal on said track.

22. The record carrier as claimed in claim 20, wherein said address codes and said auxiliary codes are arranged in said auxiliary signal such that there are codes at equidistant locations on said track, said address codes indicating distances, as measured in the track direction, between locations at which they are located and a specific reference position, whereby a clock signal can be derived from said auxiliary signal which is in synchronism with the codes at equidistant locations on said track.

23. The record carrier as claimed in claim 22, wherein said address codes include absolute time codes specifying said distances as playing time of said record carrier from said reference position.

24. The record carrier as claimed in claim 20, wherein said track is transversely modulated such that there is a periodic excursion of said track transverse to the track direction, said excursion having a frequency in conformity with said auxiliary signal.

25. The record carrier as claimed in claim 20, wherein said track portions are substantially concentric about a common center of rotation, and said address codes indicate the addresses of said track portions in relation to a reference position which is at a predetermined radial distance from said center of rotation.

26. The record carrier as claimed in claim 25, wherein said auxiliary codes specify a track portion at a radial distance from said reference position at which a table of contents should be recorded on said record carrier.

27. The record carrier as claimed in claim 26, wherein the track portion at which the table of contents should be recorded is closer to said center of rotation than is said reference position.

28. The record carrier as claimed in claim 25, wherein said auxiliary codes specify a track portion at a radial distance from said reference position at which a lead-out signal indicating the end of said information signal must commence in order to be completed before the end of said track.

29. The record carrier as claimed in claim 20, wherein said auxiliary codes specify the location of the track portion at which a table of contents should be recorded on said record carrier.

30. The record carrier as claimed in claim 29, wherein said auxiliary codes also specify the location of the track portion at which a lead-out signal indicating the end of said information signal must commence in order to be completed before the end of said track.

31. The record carrier as claimed in claim 20, wherein said auxiliary codes specify the location of the track portion at which a lead-out signal indicating the end of said information signal must commence in order to be completed before the end of said track.

32. The record carrier as claimed in claim 20, wherein said address codes and said auxiliary codes have the same data format.

33. The record carrier as claimed in claim 32, wherein said auxiliary codes are distinguished from said address codes in that said auxiliary codes comprise bit combinations which do not occur in said address codes.

34. The record carrier as claimed in claim 20, wherein said auxiliary codes are distinguished from said address codes in that said auxiliary codes comprise bit combinations which do not occur in said address codes.

* * * * *

UNITED STATES PATENT AND TRADEMARK OFFICE
CERTIFICATE OF CORRECTION

PATENT NO. : 5,418,764
DATED : May 23, 1995
INVENTOR(S) : Roth et al.

It is certified that error appears in the above-identified patent and that said Letters Patent is hereby corrected as shown below:

| | | |
|---|---|---|
| Column 11, | line 56, | change "characterized in that to --wherein--; |
| | line 59, | change "1" to --6--; |
| | line 60, | change "said" to --the--; |
| | | delete "of"; |
| | | insert --.-- after "time"; |
| | line 61, | delete in its entirety; |
| | line 68, | change "2" to --1--. |
| Column 12, | line 26, | insert --,-- after "1"; |
| | line 37, | change "rotation and," to --rotation, and--; |
| | line 56, | delete "at"; |
| | line 60, | change "9" to --1--. |

Signed and Sealed this

First Day of December, 1998

Attest:

BRUCE LEHMAN

Attesting Officer

Commissioner of Patents and Trademarks